US010169413B2

United States Patent
Asaad et al.

(10) Patent No.: US 10,169,413 B2
(45) Date of Patent: *Jan. 1, 2019

(54) SCALABLE ACCELERATION OF DATABASE QUERY OPERATIONS

(71) Applicant: International Business Machines Corporation, Armonk, NY (US)

(72) Inventors: Sameh W. Asaad, Briarcliff Manor, NY (US); Parijat Dube, Yorktown Heights, NY (US); Hong Min, Poughkeepsie, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,097

(22) Filed: Aug. 17, 2016

(65) Prior Publication Data

US 2016/0357817 A1 Dec. 8, 2016

Related U.S. Application Data

(63) Continuation of application No. 13/961,095, filed on Aug. 7, 2013, now Pat. No. 9,495,418.

(51) Int. Cl.
*G06F 17/30* (2006.01)

(52) U.S. Cl.
CPC .. *G06F 17/30469* (2013.01); *G06F 17/30463* (2013.01); *G06F 17/30466* (2013.01); *G06F 17/30477* (2013.01)

(58) Field of Classification Search
CPC ........ G06F 17/30469; G06F 17/30463; G06F 17/30466; G06F 17/30477
See application file for complete search history.

(56) References Cited

U.S. PATENT DOCUMENTS

| 738,247 A | 9/1903 | Schoof |
| 5,210,870 A | 5/1993 | Baum et al. |

(Continued)

FOREIGN PATENT DOCUMENTS

| EP | 2182448 A1 | 5/2010 |
| JP | 2001000018 A | 1/2004 |

(Continued)

OTHER PUBLICATIONS

U.S. Appl. No. 12/246,751, filed Oct. 7, 2008; "Dynamically Adjustable Tournament Tree".

(Continued)

*Primary Examiner* — Jared M Bibbee
(74) *Attorney, Agent, or Firm* — Cantor Colburn LLP; Rabin Bhattacharya (57) ABSTRACT

Embodiments include methods, systems and computer program products for offloading multiple processing operations to an accelerator. Aspects include receiving a database query from an application, performing an analysis on the query, and identifying a plurality of available accelerators. Aspects further include retrieving cost information for one or more templates available on each of the plurality of available accelerators, determining a query execution plan based on the cost information and the analysis on the query, and offloading one or more query operations to at least one of the plurality of accelerators based on the query execution plan.

14 Claims, 8 Drawing Sheets

(56) References Cited

U.S. PATENT DOCUMENTS

| | | | |
|---|---|---|---|
| 5,274,805 A * | 12/1993 | Ferguson | G06F 7/24 |
| 5,287,494 A | 2/1994 | Garcia et al. | |
| 5,355,478 A | 10/1994 | Brady et al. | |
| 5,579,514 A | 11/1996 | Turek et al. | |
| 5,619,693 A | 4/1997 | Troisi | |
| 5,619,713 A | 4/1997 | Baum et al. | |
| 6,282,541 B1 | 8/2001 | Hoa et al. | |
| 6,330,559 B1 | 12/2001 | Azuma | |
| 6,385,612 B1 | 5/2002 | Troisi | |
| 6,748,386 B1 | 6/2004 | Li | |
| 6,891,834 B1 | 5/2005 | Dally et al. | |
| 7,158,996 B2 | 1/2007 | Croisettier et al. | |
| 7,383,247 B2 * | 6/2008 | Li | G06F 17/30967 |
| 8,135,747 B2 | 3/2012 | Anzalone et al. | |
| 8,185,867 B2 * | 5/2012 | Robinson | G06F 8/00 717/105 |
| 8,244,718 B2 | 8/2012 | Chamdani et al. | |
| 8,261,020 B2 | 9/2012 | Krishnaprasad et al. | |
| 8,321,476 B2 | 11/2012 | Kirk et al. | |
| 8,392,463 B2 | 3/2013 | Gautam et al. | |
| 8,645,623 B1 | 2/2014 | O'Shea et al. | |
| 8,688,683 B2 * | 4/2014 | Simon | G06F 17/30463 707/713 |
| 9,251,219 B2 | 2/2016 | Asaad et al. | |
| 2002/0078023 A1 * | 6/2002 | Lawton | G06F 17/30864 |
| 2003/0018630 A1 * | 1/2003 | Indeck | G06F 17/30477 |
| 2003/0212668 A1 | 11/2003 | Hinshaw et al. | |
| 2006/0224563 A1 * | 10/2006 | Hanson | G06F 17/30463 |
| 2007/0005925 A1 | 1/2007 | Burkley et al. | |
| 2007/0169059 A1 * | 7/2007 | Halambi | G06F 8/4452 717/160 |
| 2007/0277036 A1 * | 11/2007 | Chamberlain | G06F 9/44505 713/171 |
| 2008/0183688 A1 * | 7/2008 | Chamdani | G06F 17/30442 |
| 2008/0189252 A1 | 8/2008 | Branscome et al. | |
| 2008/0250011 A1 | 10/2008 | Haubold et al. | |
| 2009/0106194 A1 | 4/2009 | Furusho | |
| 2009/0132638 A1 | 5/2009 | Kim et al. | |
| 2009/0313436 A1 | 12/2009 | Krishnaprasad et al. | |
| 2010/0005077 A1 * | 1/2010 | Krishnamurthy | G06F 17/30463 707/E17.136 |
| 2010/0042624 A1 | 2/2010 | Min et al. | |
| 2010/0088490 A1 * | 4/2010 | Chakradhar | G06F 8/45 712/34 |
| 2010/0185954 A1 | 7/2010 | Simernitski et al. | |
| 2010/0293338 A1 | 11/2010 | Krishnaprasad et al. | |
| 2011/0167056 A1 * | 7/2011 | Khanolkar | G06F 17/30463 707/718 |
| 2012/0017126 A1 | 1/2012 | Yamano | |
| 2012/0047126 A1 * | 2/2012 | Branscome | G06F 17/30519 707/714 |
| 2012/0079141 A1 * | 3/2012 | Ushiku | G06F 13/1652 710/26 |
| 2012/0084543 A1 * | 4/2012 | Pross | G06F 9/3881 713/1 |
| 2012/0124055 A1 | 5/2012 | Deubel et al. | |
| 2012/0124070 A1 | 5/2012 | Mishra et al. | |
| 2012/0136875 A1 | 5/2012 | Pan et al. | |
| 2012/0246156 A1 | 9/2012 | Gupta et al. | |
| 2012/0246170 A1 | 9/2012 | Iantorno | |
| 2012/0278339 A1 | 11/2012 | Wang | |
| 2012/0310882 A1 | 12/2012 | Werner et al. | |
| 2013/0054942 A1 | 2/2013 | Serrano | |
| 2013/0282687 A1 | 10/2013 | Ah-Pine et al. | |
| 2014/0351239 A1 * | 11/2014 | Davis | G06F 17/30483 707/718 |
| 2015/0046427 A1 | 2/2015 | Asaad et al. | |
| 2015/0046428 A1 | 2/2015 | Asaad et al. | |
| 2015/0046430 A1 | 2/2015 | Asaad et al. | |
| 2015/0046453 A1 | 2/2015 | Asaad et al. | |
| 2015/0046475 A1 | 2/2015 | Asaad et al. | |
| 2015/0046478 A1 | 2/2015 | Asaad et al. | |
| 2015/0046486 A1 | 2/2015 | Asaad et al. | |
| 2015/0254294 A1 * | 9/2015 | Marais | G06F 11/073 707/690 |
| 2016/0012107 A1 | 1/2016 | Asaad et al. | |
| 2016/0110390 A1 | 4/2016 | Asaad et al. | |
| 2016/0110395 A1 | 4/2016 | Asaad et al. | |
| 2016/0188294 A1 | 6/2016 | Sukhwani et al. | |
| 2016/0188644 A1 | 6/2016 | Sukhwani et al. | |

FOREIGN PATENT DOCUMENTS

| | | |
|---|---|---|
| WO | 9954833 A2 | 10/1999 |
| WO | 2007061430 A1 | 5/2007 |
| WO | 2007143198 A2 | 12/2007 |
| WO | 2012024585 A1 | 2/2012 |
| WO | 2013055812 A1 | 4/2013 |

OTHER PUBLICATIONS

Cheng et al., "An Efficient Hybrid Join Algorithm: A DB2 Prototype", Data Base Technology Institute, IBM Santa Teresa Laboratory, San Jose, CA 95161, USA, 1991 IEEE, pp. 171-180.

CSE 326 Data Structure "Pointers", dated Jan. 19, 2005; pp. 1-6.

Geambasu et al., "Vanish: Increasing Data Privacy with Self-Destructing Data", 18th USENIX Security Symposium; 52 pgs.

Gosink et al., "Query-Driven Visualization of Time-Varying Adaptive Mesh Refinement Data", IEEE Transactions on Visualization and Computer Graphics, vol. 14, No. 6, Nov./Dec. 2008; pp. 1715-1722.

Hey et al., "Cyberinfrastructure for e-Science", Science 308, 817 (2005); cover page and pp. 817-821.

Iyer, Balakrishna R. "Hardware Assisted Sorting in IBM's DB2 DBMS", International Conference on Management of Data, COMAD 2005b, Dec. 20-22, 2005, Computer Society of India, 2005; 9 pgs.

Jenson, Jonas Julian "Reconfigurable FPGA Accelerator for Databases," Master Thesis, University of Oslo Department of Informatics; Aug. 1, 2012; 107 pgs.

Kumar et al., "Improved Algorithms and Data Structures for Solving Graph Problems in External Memory", Department of EECS, Northwestern university, Evanston, IL 60208, 1996 IEEE, pp. 169-176.

Ledjfors, Calle "High-Level GPU Programming Domain-specific optimization and inference", Doctoral dissertation, 2008, Department of Computer Science Lund University; 120 pgs.

Levitt et al., "An Image Understanding Environment for DARPA Supported Research and Applications, First Annual Report" Advanced Decision Systems Mountain View, CA 1991, 80 pgs.

Pawlowski, et al., "Parallel Sorting of Large Data Volumes on Distributed Memory Multiprocessors", Parallel Computer Architectures, Springer Berlin Heidelberg, 1993, 246-264, 19 pgs.

Rahkila, P., "Grain—A Java Data Analysis System for Total Data Readout", Nuclear Instruments and Methods in Physics Research Section A: Accelerators, Spectrometers, Detectors and Associated Equipment 595.3 (2008): 637-642; 13 pgs.

Singh et al., "Introduction to the IBM Netezza Warehouse Appliance," Proceedings CASCON '11 Proceedings fo the 2001 conference of the Center for Advanced Studies on Collaborative Research; pp. 385-386.

Stack, Michael "The Theory Behind the z/Architecture Sort Assist Instructions", SHARE in San Jose, Sesssion 8121; Aug. 10, 2008, pp. 1-100.

Stack, Michael, "The Theory Behind the z/Architecture Sort Assist Instructions", Neon Enterprise Software, Inc., SHARE in San Jose—Aug. 10-15, 2008, Session 8121; 100 pgs.

Stonebraker, Michael R., "Architectural Options for Object-Relational DBMSs", White Paper (1997), 16 pgs.

Sukhwani et al., "Database Analytics Acceleration using FPGAs", PACT' 12, Sep. 19-23, 2012; Minneapolis, Minnesota, USA; Copyright 2012 ACM, 10 pgs.

Sukhwani et al., "A Hardware/Software Approach for Database Query Acceleration with FPGAs", Int. J. Parallel Prog., Published online: Oct. 28, 2014; Springer; pp. 1-31.

(56) References Cited

OTHER PUBLICATIONS

Sukhwani, et al., "Database Analytics Acceleration using FPGAs," PACT '12 Proceedings of the 21st International conference on Parallel Architectures and Compilation Techniques; pp. 411-420.
Vaidya et al., "A Novel Multicontext Coarse-Grained Join Accelerator for Column-Oriented Databases," International Conference on Engineering of Reconfigurable Systems and Algorithms (ERSA), 2009; 7 pgs.
Xu et al., "Query decomposition based on ontology mapping in data integration system", Third International Conference on Natural Computation (ICNC 2007), 2007 IEEE; pp. 1-5.
Yagi et al., "GMM Foreground Segmentation Processor Based on Address Free Pixel Streams", Acoustics, Speech and Signal Processing (ICASSP), 2012 IEEE International Conference on IEEE, 2012, pp. 1653-1656.
z/Architecture: "Principles of Operation"; Tenth Edition, Sep. 2012; Publication No. SA22-7832-09; copyright IBM Corp.; 1990-2012; p. 1-1568.

\* cited by examiner

SCALABLE ACCELERATION OF DATABASE QUERY OPERATIONS

DOMESTIC PRIORITY

This application is a Continuation application of legally related U.S. Ser. No. 13/961,095, filed Aug. 7, 2013, the contents of which are incorporated by reference herein in their entirety.

BACKGROUND

The present invention relates to accelerating multiple query processing operations, and more specifically, to a system of accelerators for scalable acceleration of database query operations.

In general, a single database query includes multiple query processing operations. These query processing operations include, but are not limited to, sort operations, decompression operations, predicate evaluation operations, and join operations. Hardware acceleration of query operations has shown significant performance improvements over software implementations. This performance improvement is due to custom data paths and parallelism that can be achieved in hardware implementations.

Currently, a query operator is evaluated on a single hardware accelerator. The available resources on a single accelerator can limit the performance gains provided by the accelerator. While offloading more operations from the host to the accelerator is desirable for higher overall performance, offloading multiple operations onto a single accelerator chip can reduce the amount of resource available to each operation, thereby potentially resulting in lower performance gains.

SUMMARY

Embodiments include methods, systems and computer program products for offloading multiple processing operations to an accelerator. Aspects include receiving a database query from an application, performing an analysis on the query, and identifying a plurality of available accelerators. Aspects further include retrieving cost information for one or more templates available on each of the plurality of available accelerators, determining a query execution plan based on the cost information and the analysis on the query, and offloading one or more query operations to at least one of the plurality of accelerators based on the query execution plan.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein include a system of accelerators for scalable acceleration of database query operations. In exemplary embodiments, one or more query processing operations are offloaded to multiple accelerators, thereby increasing the amount of hardware resources available to each query processing operation. In addition, by using multiple accelerators inter-query and/or intra-query parallelism can be increased. As a result, the performance of the database query operations is improved. For example, the speed and capacity of the database query operations can be increased.

Figure 1:
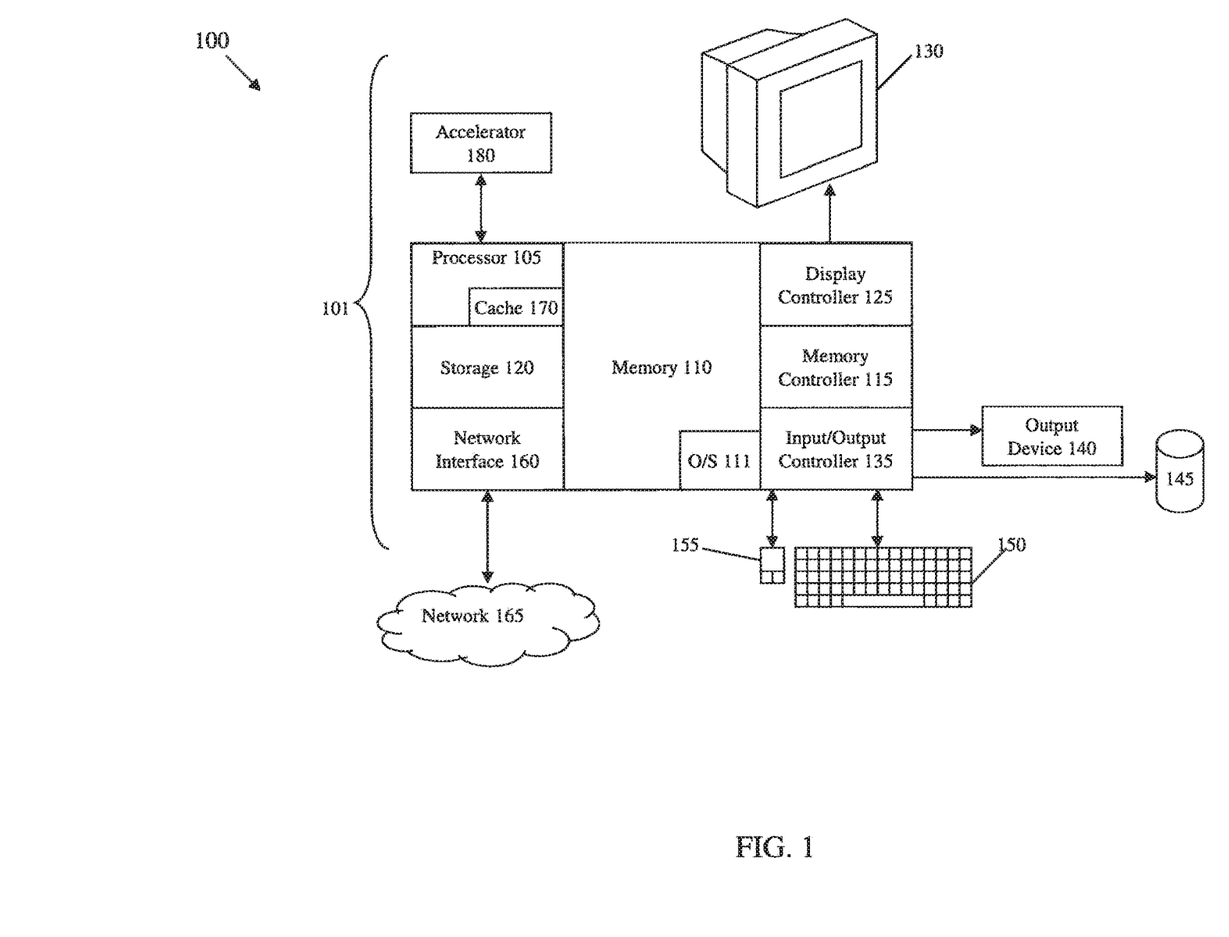
FIG. 1 depicts a block diagram of a computer system for practicing the teachings herein according to an embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA) or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

Figure 2:
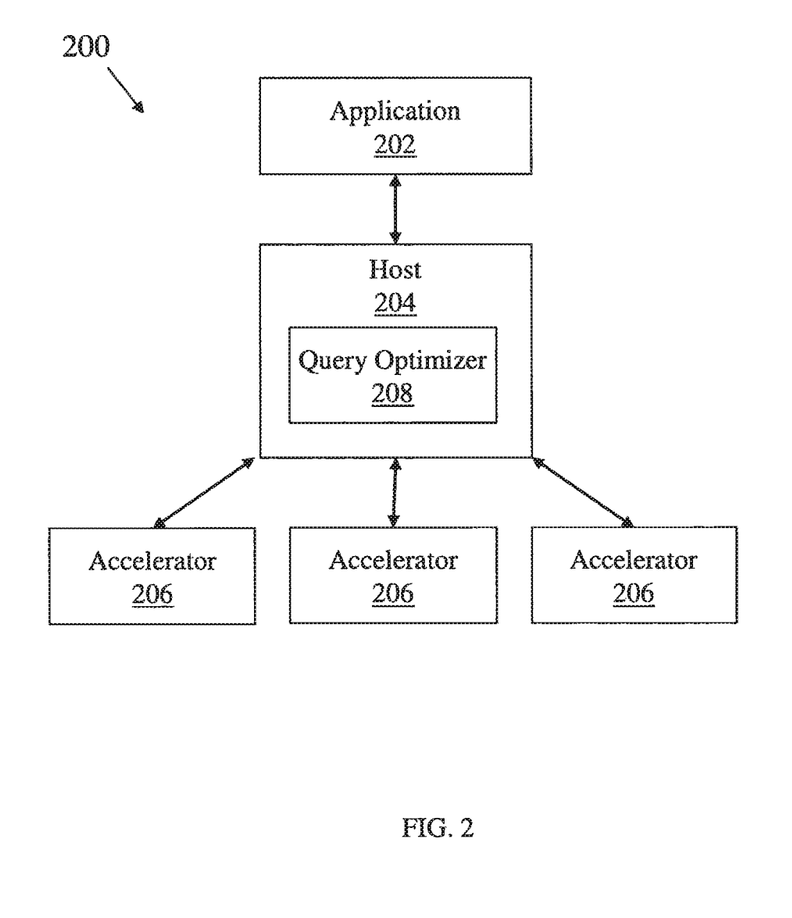
FIG. 2 depicts a block diagram of a system of accelerators for scalable acceleration of database query operations in accordance with an exemplary embodiment.

Referring now to FIG. 2, a block diagram illustrating a system 200 having multiple accelerators 206 for accelerating database query operations in accordance with an exemplary embodiment is shown. The system 200 includes a host 204, which may be a computer as shown in FIG. 1 having a central processing unit configured to execute database management software. In exemplary embodiments, the host 204 receives database queries from an application 202 and responsively offloads one or more query processing operations to one or more of the accelerators 206.

In exemplary embodiments, the host 204 includes a query optimizer 208, which receives a query from an application 202 and performs analysis on the query. Based on the analysis of the query, the query optimizer 208 selects one or more accelerator 206 from a plurality of accelerators to execute the query processing operations. In exemplary embodiments, the query optimizer 208 may also select an accelerator template from a plurality of accelerator templates that are available for each of the accelerators 206. In exemplary embodiments, each of the plurality of accelerator templates is a stored processing configuration that the accelerator 206 is capable of executing.

In exemplary embodiments, each accelerator 206, and accelerator template, has a cost model associated with it. The cost model includes the throughput and the latency of the accelerator/template. Each accelerator 206 also has a status that is reported to the host 204. The status indicates whether and when the accelerator 206 is available. In exemplary embodiments, the cost model and status information are used by the query optimizer 208 to determine a query execution plan having an optimized performance and resource utilization. This information, in combination with other software operator cost, is used by the query optimizer 208 to determine a query execution plan including which query operations to off-loaded, which accelerators to use, and how the multiple accelerated operators and software operators should be combined. The host 204 can decide optimization goals among various options such as shortest query time, maximizing accelerator utilization, or minimizing the use of host resources (such as CPU and memory). In exemplary embodiments, the query optimizer 208 uses dynamic programming, heuristics, or other optimization algorithms or the combinations thereof to determine a query plan with specified optimization goal(s).

In exemplary embodiments, multiple accelerators 206 can be arranged in the system 200 in a variety of configurations. For example, multiple accelerator chips may be located on a single accelerator card (e.g. PCIe card), a single accelerator chip may be located on each of multiple accelerator cards in the system, or a combination of the two arrangements can be used. In exemplary embodiments, the communication among different accelerators can be performed in a variety a ways based on the system configuration. For example, communication among different accelerators can be direct chip-to-chip communication, peer-to-peer communication over a system bus, or communication via the host CPU memory. In exemplary embodiments, pipelined execution of database query operation across different accelerators can reduce the latency of data transfer from one accelerator to the next and maintain high sustained query processing throughput. In exemplary embodiments, a plurality of accelerators can be heterogeneous and can be accelerating different parts of a single query or different queries in parallel.

In exemplary embodiments, a database query may involve multiple operations such as decompression, predicate evaluation, projection, sort, joins etc. Performing these operations on an accelerator, such as an FPGA, can boost the database query performance. Moreover, concurrent and/or pipelined execution of more than one operations on the accelerator, as shown in FIG. 3, provides an increase in the processing offloaded by the host, better amortization of set-up/teardown and data transfer overheads, and higher overall performance of query processing.

Figure 3:
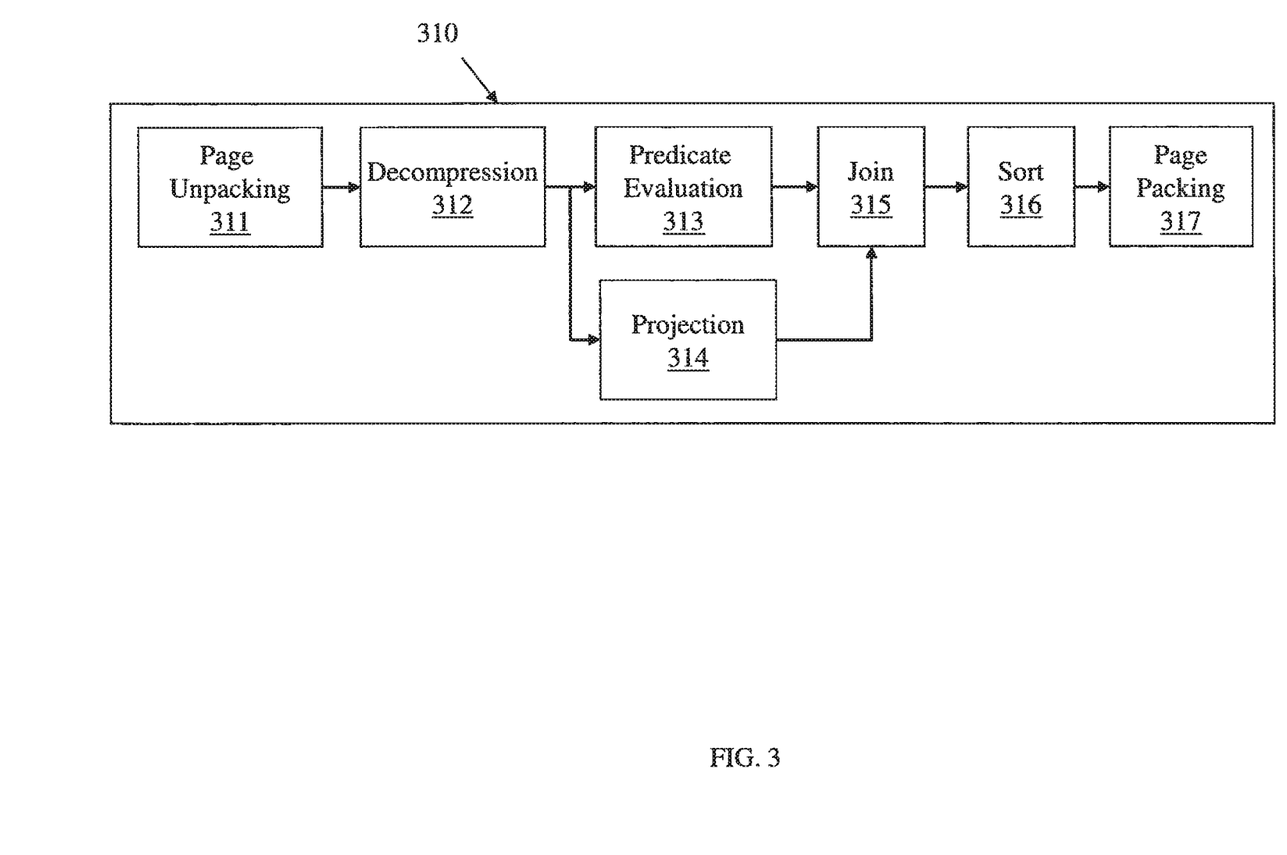
FIG. 3 depicts a block diagram of an accelerator in accordance with an exemplary embodiment.

Referring now to FIG. 3, a block diagram of an accelerator 310 is shown. As illustrated the accelerator 310 is configured to perform a plurality of query operations and includes a module corresponding to each of the plurality of query operations. In particular, the accelerator 310 includes a page unpacking module 311, a decompression module 312, a predicate evaluation module 313, a projection module 314, a join module 315, a sort module 316 and a page packing module 317.

In one embodiment, multiple query operations may be offloaded onto a single accelerator, as shown in FIG. 3. In other embodiments, multiple query operations of a database query may be offloaded across a plurality of accelerators, which may result in increased overall performance of the database query. In exemplary embodiments, the plurality of accelerators may be arranged in a pipelined/concurrent fashion to accelerate the query operations. In addition, the accelerators may be of the same type or different type. For example, a system with multiple accelerators may consist of multiple FPGAs, while another system may consist of a combination of FPGAs, GPUs and other accelerators. In exemplary embodiments, multiple accelerators can be exploited to accelerate one or more operators within a database query or for accelerating multiple queries in parallel in a variety of different ways.

Figure 4:
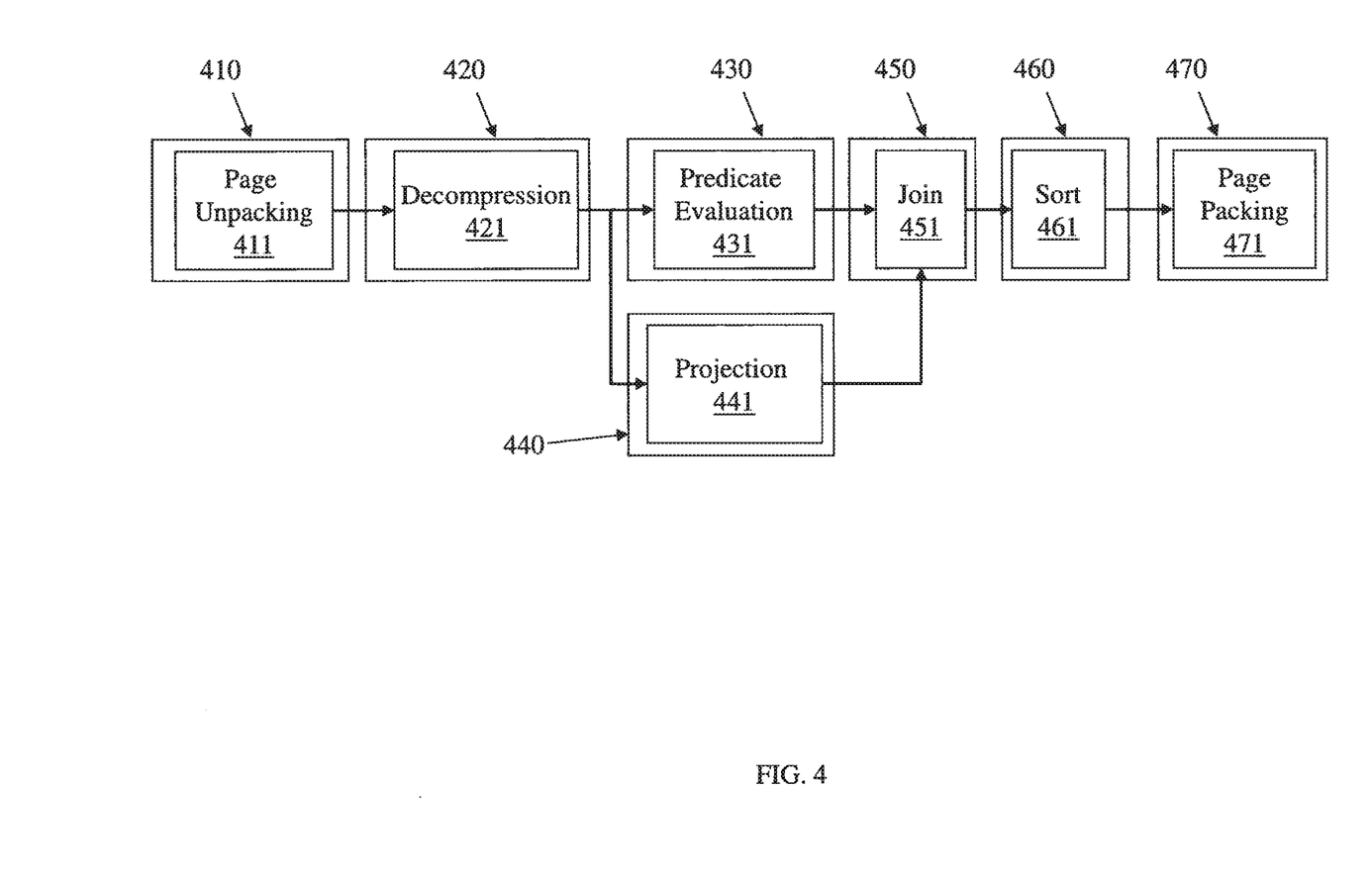
FIG. 4 depicts a block diagram of a distribution of database query operations across a plurality of accelerators in accordance with an exemplary embodiment.

Referring now to FIG. 4, a block diagram of a distribution of database query operations across a plurality of accelerators is shown. As illustrated, each of the database query operations is disposed on a separate accelerator. In particular, a first accelerator 410 includes a page unpacking module 411, a second accelerator 420 includes a decompression module 421, a third accelerator 430 includes a predicate evaluation module 331, a fourth accelerator 440 includes a projection module 441, a fifth accelerator 450 includes a join module 451, a sixth accelerator 460 includes a sort module 461 and a seventh accelerator 470 includes a page packing module 471. In exemplary embodiments, a single operation may be decomposed into multiple parts and a single accelerator may iteratively execute the multiple parts, before forwarding the results to the next accelerator.

Figure 5:
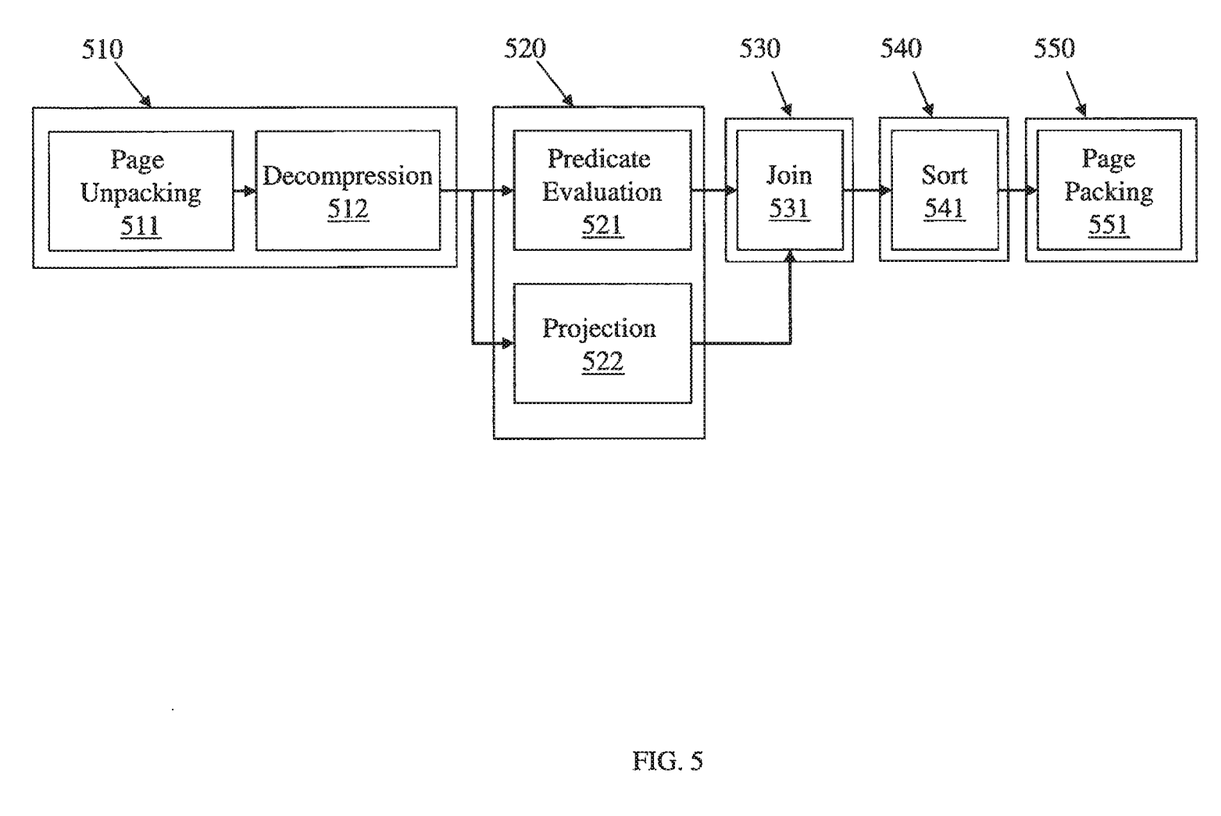
FIG. 5 depicts a block diagram of a distribution of database query operations across a plurality of accelerators in accordance with an exemplary embodiment.

Referring now to FIG. 5, a block diagram of a distribution of database query operations across a plurality of accelerators is shown. As illustrated, one or more accelerators include multiple database query operations and some accelerators only include a single database query operation. In particular, a first accelerator 510 includes a page unpacking module 511 and a decompression module 512, a second accelerator 520 includes a predicate evaluation module 521 and a projection module 522, a third accelerator 530 includes a join module 531, a fourth accelerator 540 includes a sort module 541, and a fifth accelerator 550 includes a page packing module 551.

Figure 6:
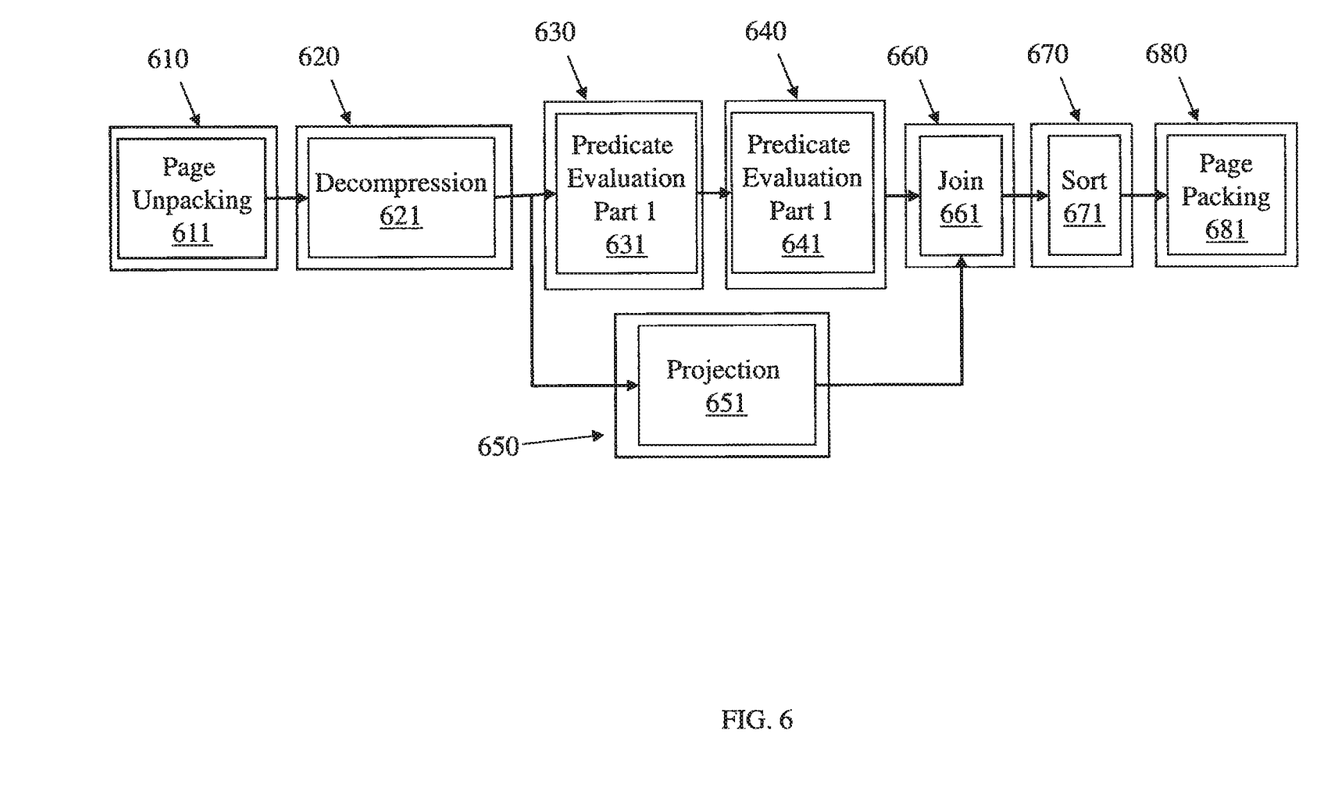
FIG. 6 depicts a block diagram of a distribution of database query operations across a plurality of accelerators in accordance with an exemplary embodiment.

Referring now to FIG. 6, a block diagram of a distribution of database query operations across a plurality of accelerators is shown. As illustrated, one or more database query operations may be disposed across multiple accelerators. In particular, a first accelerator 610 includes a page unpacking module 611, a second accelerator 620 includes a decompression module 621, a third accelerator 630 includes a first part of predicate evaluation module 631, a fourth accelerator 640 includes a second part of predicate evaluation module 641, a fifth accelerator 650 includes a projection module 651, a sixth accelerator 660 includes a join module 661, a seventh accelerator 670 includes a sort module 671, and an eighth accelerator 680 includes a page packing module 681.

Figure 7:
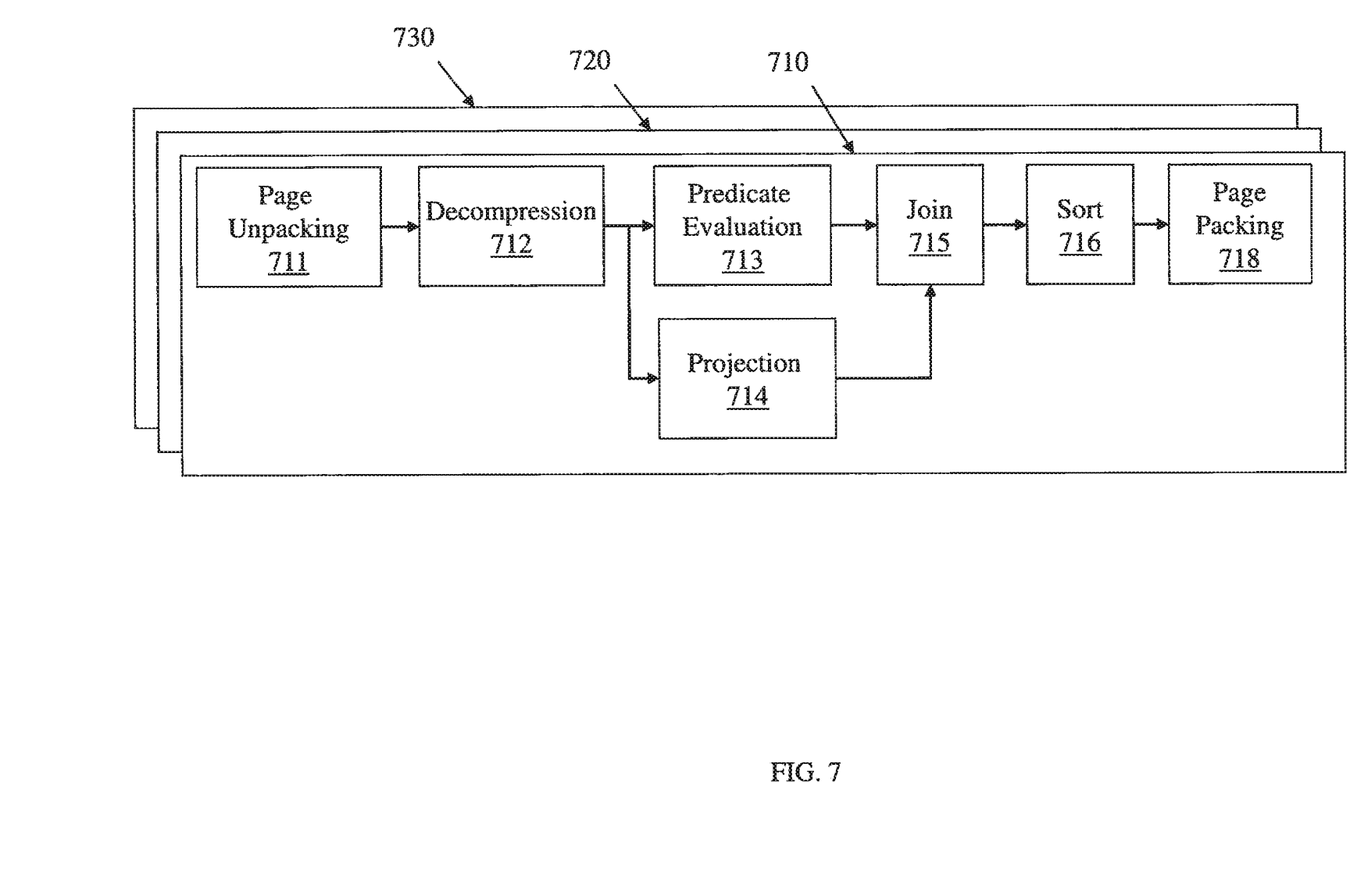
FIG. 7 depicts a block diagram of a distribution of database query operations across a plurality of accelerators in accordance with an exemplary embodiment.

Referring now to FIG. 7, a block diagram of a distribution of database query operations across a plurality of accelerators is shown. As illustrated, all of the database query operations may be disposed on a single accelerator 710 and one or more accelerators 720, 730 may be configured to work concurrently. In exemplary embodiments, the individual accelerators 710, 720, 730 may be configured to work independently on different parts of a database table for a single database query. In other exemplary embodiments, all of the database query operations for a database query may be disposed on a single accelerator 710, with multiple accelerators 720, 730 working concurrently and independently on different queries.

Figure 8:
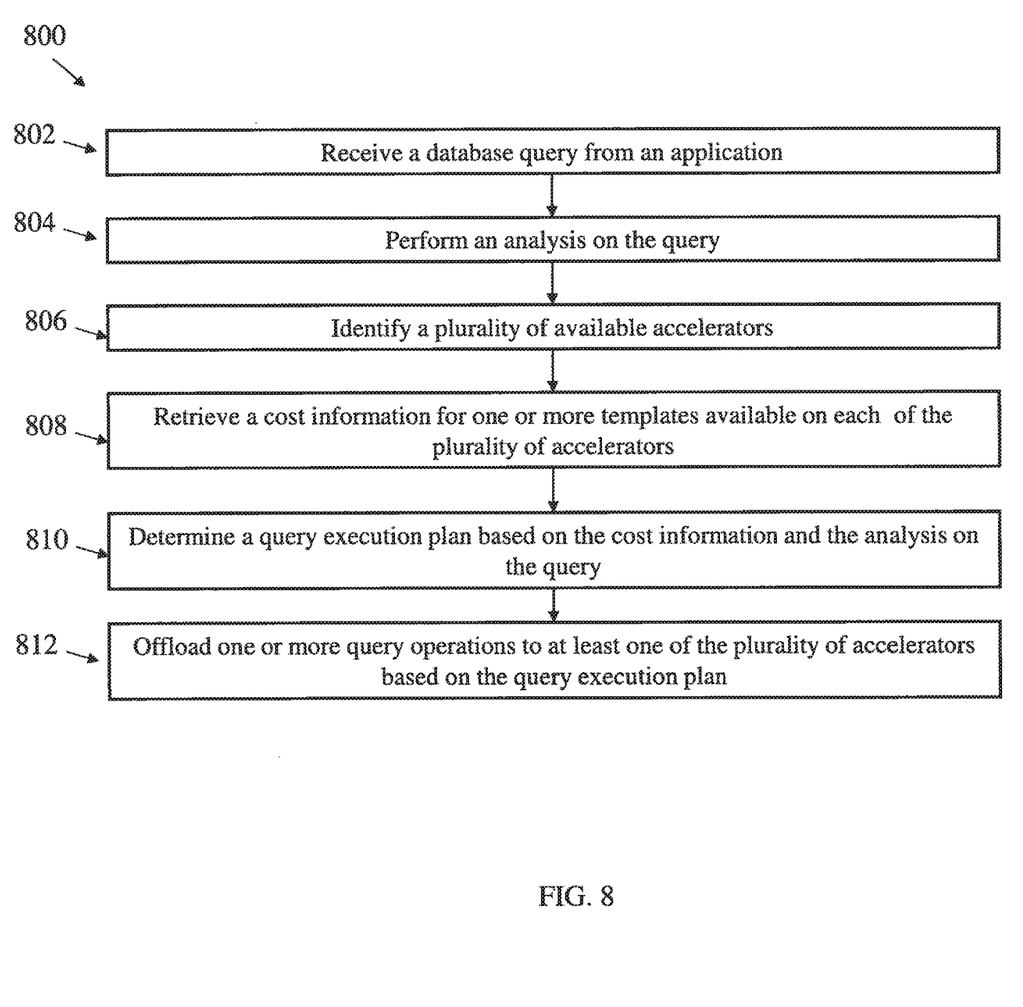
FIG. 8 depicts a flow diagram of a method for accelerating multiple query processing operations in accordance with an exemplary embodiment.

Referring now to FIG. 8, a flow diagram illustrating a method 800 for distributing database query operations across a plurality of accelerators according to an embodiment is shown. As shown at block 802, the method 800 includes receiving a database query from an application. Next, as shown at block 804, the method 800 includes performing an analysis on the query. The method 800 also includes identifying a plurality of available accelerators, as shown at block 806. Next, as shown at block 808, the method 800 includes retrieve a cost information for one or more templates available on each of the plurality of available accelerators. The method 800 also includes determining a query execution plan based on the cost information and the analysis on the query, as shown at block 810. Next, as shown at block 812, the method 800 includes offload one or more query operations to at least one of the plurality of accelerators based on the query execution plan.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising a processing device configured to:
receive a database query from an application;
perform an analysis on the query;

identify a plurality of available accelerators and a plurality of accelerator templates available on each of the plurality of available accelerators, wherein the plurality of accelerator templates represent different processing configurations that the accelerator is capable of executing;

retrieve cost information for the plurality of accelerator templates, the cost information comprising throughput and latency information;

determine, via a plurality of accelerators configured to accelerate one or more operators within a database query, a query execution plan based on the cost information, a status report indicative of an availability for each of the accelerators, and the analysis of the query;

select an accelerator template from the plurality of accelerator templates available on at least one of the plurality of available accelerators;

configure the at least one of the plurality of accelerators based on the selected accelerator template; and offload one or more query operations to at least one of the plurality of accelerators based on the query execution plan.

2. The system of claim 1, wherein the cost information includes a throughput and a latency of the one or more accelerator templates available on each of the plurality of available accelerators.

3. The system of claim 1, wherein the database query includes a plurality of query operations.

4. The system of claim 3, wherein query execution plan includes assigning each of the plurality of query operations to a different one of the plurality of available accelerators.

5. The system of claim 3, wherein query execution plan includes assigning two or more of the plurality of query operations to one of the plurality of available accelerators.

6. The system of claim 3, wherein query execution plan includes assigning all of the plurality of query operations to one of the plurality of available accelerators.

7. The system of claim 3, wherein query execution plan includes splitting the database query into multiple parts and assigning a first part of one of the plurality of query operations to one of the plurality of available accelerators and assigning a second part of the one of the plurality of query operations to another one of the plurality of available accelerators.

8. A computer program product, comprising:
a non-transitory computer readable storage medium having computer readable program code stored thereon that, when executed, performs a method, the method comprising:
receiving a database query from an application;
performing an analysis on the query;
identifying a plurality of available accelerators and a plurality of accelerator templates available on each of the plurality of available accelerators, wherein the plurality of accelerator templates represent different processing configurations that the accelerator is capable of executing;
retrieving cost information for the plurality of accelerator templates, the cost information comprising throughput and latency information;
determining, via a plurality of accelerators configured to accelerate one or more operators within a database query, a query execution plan based on the cost information, a status report indicative of an availability for each of the accelerators, and the analysis of the query;
selecting an accelerator template from the plurality of accelerator templates available on at least one of the plurality of available accelerators;
configuring the at least one of the plurality of accelerators based on the selected accelerator template; and
offloading one or more query operations to at least one of the plurality of accelerators based on the query execution plan.

9. The computer program product of claim 8, wherein the cost information includes a throughput and a latency of the one or more accelerator templates available on each of the plurality of available accelerators.

10. The computer program product of claim 8, wherein the database query includes a plurality of query operations.

11. The computer program product of claim 10, wherein query execution plan includes assigning each of the plurality of query operations to a different one of the plurality of available accelerators.

12. The computer program product of claim 10, wherein query execution plan includes assigning two or more of the plurality of query operations to one of the plurality of available accelerators.

13. The computer program product of claim 10, wherein query execution plan includes assigning all of the plurality of query operations to one of the plurality of available accelerators.

14. The computer program product of claim 10, wherein query execution plan includes splitting the database query into multiple parts and assigning a first part of one of the plurality of query operations to one of the plurality of available accelerators and assigning a second part of the one of the plurality of query operations to another one of the plurality of available accelerators.

* * * * *